US008477678B2

(12) United States Patent
Matsumura (10) Patent No.: US 8,477,678 B2
(45) Date of Patent: Jul. 2, 2013

(54) WIRELESS COMMUNICATION DEVICE, WIRELESS COMMUNICATION SYSTEM AND NETWORK CONTROL METHOD

(75) Inventor: Masafumi Matsumura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1370 days.

(21) Appl. No.: 12/140,161

(22) Filed: Jun. 16, 2008

(65) Prior Publication Data

US 2009/0003250 A1    Jan. 1, 2009

(30) Foreign Application Priority Data

Jun. 29, 2007    (JP) .................................. 2007-173053

(51) Int. Cl.
*H04B 7/14*    (2006.01)
*H04J 1/10*    (2006.01)
*H04J 3/08*    (2006.01)

(52) U.S. Cl.
USPC ........................................................ 370/315

(58) Field of Classification Search
USPC ................. 370/310, 338, 329, 336, 235, 401, 370/312, 320; 455/403
See application file for complete search history.

(56) References Cited

U.S. PATENT DOCUMENTS

| | | | |
|---|---|---|---|
| 6,026,303 A | 2/2000 | Minamisawa | |
| 6,744,752 B1 | 6/2004 | Fifield | |
| 7,342,896 B2 | 3/2008 | Ayyagari | |
| 7,542,760 B2 * | 6/2009 | Sugaya et al. | 455/420 |
| 7,804,804 B2 * | 9/2010 | Sugaya et al. | 370/338 |
| 2003/0124979 A1 * | 7/2003 | Tanada et al. | 455/41 |
| 2003/0224787 A1 * | 12/2003 | Gandolfo | 455/434 |
| 2004/0043780 A1 | 3/2004 | Sugaya et al. | |
| 2004/0174829 A1 | 9/2004 | Ayyagari | |

(Continued)

FOREIGN PATENT DOCUMENTS

| | | |
|---|---|---|
| JP | 2002-190806 | 7/2002 |
| JP | 2002-353867 | 12/2002 |

(Continued)

OTHER PUBLICATIONS

J. Jeong, M. Cho, S. Kim, D. Kim, J. Lee, PNC Candidate Inquiry Method for PNC Handover on WPAN, Proceedings of the 15th IEEE International Symposium on Personal, Indoor and Mobile Radio Communications, 2004, pp. 1752-1756.*

(Continued)

*Primary Examiner* — John Blanton
*Assistant Examiner* — Christopher Crutchfield
(74) *Attorney, Agent, or Firm* — Blakely, Sokoloff, Taylor & Zafman LLP (57) ABSTRACT

According to one embodiment, a wireless communication device executes, with use of a wireless signal of a millimeter-wave band, wireless communication with each of devices which are present in an ad-hoc network. The wireless communication device includes a scan request transmission unit, a selection unit, and a coordinator change request unit. The scan request unit requests a coordinator to transmit a scan instruction to each of the devices. Each device, which has received the scan instruction from the coordinator, executes a scan process for detecting all devices which belong to a communication range thereof. The selection unit selects, on the basis of a result of the scan process, a device having a communication range to which at least the wireless communication device belongs. The coordinator change request unit requests the coordinator to execute a process for transferring an authority of the coordinator to the selected device.

10 Claims, 6 Drawing Sheets

U.S. PATENT DOCUMENTS

| | | | |
|---|---|---|---|
| 2004/0233858 A1* | 11/2004 | Karaoguz | 370/254 |
| 2005/0014467 A1* | 1/2005 | Ishiwata et al. | 455/39 |
| 2005/0047383 A1* | 3/2005 | Yoshida | 370/338 |
| 2005/0058117 A1* | 3/2005 | Morioka et al. | 370/346 |
| 2005/0075084 A1* | 4/2005 | Salokannel et al. | 455/126 |
| 2005/0085190 A1* | 4/2005 | Nishikawa | 455/63.1 |
| 2005/0237979 A1* | 10/2005 | Kim et al. | 370/331 |
| 2006/0031429 A1 | 2/2006 | Ayyagari | |
| 2006/0142034 A1* | 6/2006 | Wentink et al. | 455/515 |
| 2006/0166683 A1* | 7/2006 | Sharma et al. | 455/456.5 |
| 2006/0206601 A1* | 9/2006 | Shvodian | 709/223 |
| 2006/0227740 A1* | 10/2006 | McLaughlin et al. | 370/329 |
| 2006/0242025 A1 | 10/2006 | Nishihara et al. | |
| 2007/0100983 A1* | 5/2007 | Takasaki et al. | 709/223 |
| 2007/0268862 A1* | 11/2007 | Singh et al. | 370/329 |
| 2007/0270121 A1* | 11/2007 | Shao et al. | 455/403 |
| 2007/0293223 A1* | 12/2007 | Kuwana | 455/436 |
| 2008/0112364 A1* | 5/2008 | Kwon et al. | 370/331 |
| 2008/0112370 A1* | 5/2008 | Kwon | 370/336 |
| 2008/0144553 A1* | 6/2008 | Shao et al. | 370/310 |
| 2008/0175209 A1* | 7/2008 | Abdel-Kader et al. | 370/338 |
| 2008/0279160 A1* | 11/2008 | Qin et al. | 370/338 |
| 2009/0031365 A1* | 1/2009 | Kwon et al. | 725/81 |
| 2009/0111532 A1* | 4/2009 | Salokannel et al. | 455/574 |
| 2009/0129337 A1* | 5/2009 | Kwon et al. | 370/331 |
| 2010/0097967 A1* | 4/2010 | Kwon et al. | 370/310 |

FOREIGN PATENT DOCUMENTS

| | | |
|---|---|---|
| JP | 200650636 | 2/2006 |
| JP | 2006-246357 | 9/2006 |
| JP | 200720717 | 2/2007 |

OTHER PUBLICATIONS

Chinese Patent Application No. 200810131731.4, The Decision of Rejection, mailed Oct. 9, 2011, (with English Translation).

Chinese Patent Application No. 200810131731.4, The Second Office Action, mailed May 20, 2011, (English Translation).

Japanese Patent Application No. 2007-173053, First Office Action, mailed Mar. 13, 2012, (with English Translation).

* cited by examiner

| Devices | Order |
|---|---|
| Coordinator device | 0 |
| TV | 1 |
| Set top box | 2 |
| DVD player | 3 |
| DVD recoder | 4 |
| AV receiver | 5 |
| PC | 6 |
| Projector | 7 |
| Game | 8 |
| Digital video camera | 9 |
| Digital still camera | 10 |
| Other | 11 |

FIG. 9

WIRELESS COMMUNICATION DEVICE, WIRELESS COMMUNICATION SYSTEM AND NETWORK CONTROL METHOD

CROSS-REFERENCE TO RELATED APPLICATIONS

This application is based upon and claims the benefit of priority from Japanese Patent Application No. 2007-173053, filed Jun. 29, 2007, the entire contents of which are incorporated herein by reference.

BACKGROUND

1. Field

One embodiment of the present invention relates to a wireless communication device which is used in an ad-hoc network including a plurality of devices which execute wireless communication, a wireless communication system and a network control method.

2. Description of the Related Art

In recent years, a wireless communication system, which makes use of an ad-hoc network, has been developed.

In the ad-hoc network, any one device selected from devices, which are present in the ad-hoc network, functions as a coordinator. The coordinator controls the entire ad-hoc network.

Jpn. Pat. Appln. KOKAI Publication No. 2006-50636 discloses a method of selecting a coordinator from a plurality of nodes (devices) which constitute an ad-hoc network.

In this method, the coordinator is selected from the nodes by using (a) a maximum coverage range, (b) a maximum capacity and (c) a device class, as standards for selection.

In the coordinator selection method of Jpn. Pat. Appln. KOKAI Publication No. 2006-50636, however, no consideration is given to which of the devices a user wishes to use. Thus, depending on the selected coordinator, it is possible that the device which the user wishes to use is not included in the communication range that is covered by the selected coordinator, and the device which the user wishes to use cannot execute wireless communication with other devices.

In a wireless communication system using radio waves of a millimeter-wave band in order to realize high-speed data transmission, the rectilinearity of propagation of the radio waves is very high, and the wireless communication environment between devices greatly varies depending on the positional relationship between the devices and the presence/absence of an obstacle between the devices.

In the wireless communication system using the radio waves of the millimeter-wave band, it is highly possible that there is a device which cannot execute wireless communication with the coordinator, that is, a device which cannot take part in the ad-hoc network.

Therefore, there is a need for a technique for reconfiguring an ad-hoc network so as to constitute a network centering on a certain specified device such as a device which the user wishes to use.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a wireless communication device which executes, with use of a wireless signal of a millimeter-wave band, wireless communication with each of a plurality of devices which are present in an ad-hoc network. The wireless communication device includes a scan request transmission unit, a selection unit, and a coordinator change request unit. The scan request unit requests a coordinator to transmit a scan instruction to each of the devices. The coordinator is one of the plurality of devices and controls the ad-hoc network. Each device, which has received the scan instruction from the coordinator, executes a scan process for detecting all devices which belong to a communication range thereof. The selection unit selects, on the basis of a result of the scan process, a device having a communication range to which at least the wireless communication device belongs. The coordinator change request unit requests the coordinator to execute a process for transferring an authority of the coordinator to the selected device.

A wireless communication system according to an embodiment of the present invention executes wireless communication by making use of a wireless signal of a millimeter-wave band (e.g. millimeter waves of a 600 GHz band). The work for standardizing the wireless communication technology using millimeter waves is in progress in the IEEE 802.15 committee. The wireless communication technology, the standardizing work for which is now in progress, targets not on intermediate-range wireless networks such as wireless LANs, but on a WPAN (Wireless Personal Area Network) which is a short-range wireless network covering a range of less than about 10 m.

The wireless communication technology using millimeter waves enables data communication at a much higher speed than the wireless LAN or Bluetooth®. Specifically, this wireless communication technology can realize a transmission rate on the gigabit order. Therefore, this wireless communication technology is prospective as a technique for implementing video transmission cables of, e.g. DVI (Digital Video Interactive) or HDMI (High Definition Multimedia Interface), by a wireless scheme.

On the other hand, since millimeter waves have high rectilinearity of propagation (directivity), a technique different from the technique of existing wireless communication systems, such as wireless LAN, is needed in order to realize user-friendliness.

In the wireless communication system according to the embodiment of the invention, an ad-hoc network including a plurality of devices, which execute wireless communication with use of wireless signals of a millimeter-wave band, is controlled by a coordinator which is one of these devices. An overall control of the ad-hoc network is executed by the coordinator. This coordinator is called "PNC" (piconet coordinator) Any one of the devices belonging to the ad-hoc network functions as the PNC, and the wireless communication between the other devices in the ad-hoc network is controlled by the device functioning as the PNC.

Figure 1:
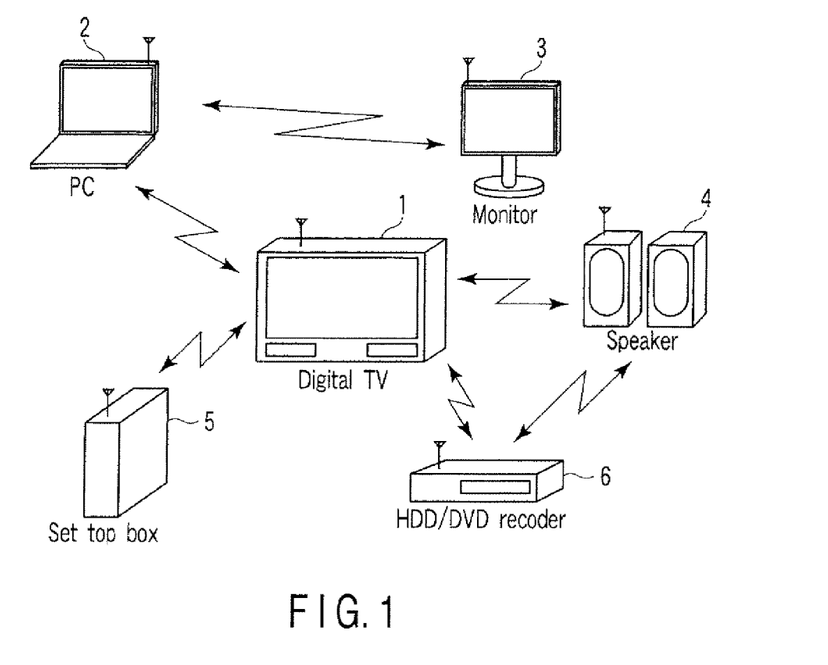
FIG. 1 is an exemplary block diagram showing a mode of use of a wireless communication system according to an embodiment of the invention.

FIG. 1 shows an example of the mode of use of the present wireless communication system. The wireless communication system shown in FIG. 1 is used, for example, for the purpose of transmitting non-compressed high-definition video data between AV devices such as a TV and a DVD player.

This wireless communication system is an ad-hoc network system including a plurality of devices (wireless communication devices) such as a digital TV 1, a personal computer (PC) 2, a monitor (display) 3, a speaker 4, a set-top box 5 and an HDD/DVD recorder 6.

The digital TV 1 is a device having a video data display function and an audio output function. The digital TV 1 can execute display of video data which is transmitted from, for instance, the PC 2, set-top box 5 or HDD/DVD recorder 6, and execute output of sound corresponding to audio data which is transmitted from the PC 2, set-top box 5 or HDD/DVD recorder 6. In the ad-hoc network shown in FIG. 1, the digital TV 1, for instance, functions as the PNC.

The PC 2 is a device having a function of transmitting video data and audio data to the digital TV 1 or the monitor 3. The monitor 3 is a device having a function of video data display function. The speaker 4 is a device having an audio output function, and executes output of sound corresponding to audio data which is transmitted from, for instance, the digital TV 1, PC 2 or HDD/DVD recorder 6.

The set-top box 5 is a device which can execute two-way multimedia communication, such as video on-demand, by wireless connection to, e.g. the TV 1. The HDD/DVD recorder 6 is a device which executes recording and playback of video data and audio data. For example, the HDD/DVD recorder 6 executes a process of recording video data and audio data, which are transmitted from the TV 1, on storage media, and a process of playing back AV content which is recorded on storage media, and transmitting the played-back AV content to the TV 1 or the speaker 4.

Next, a specific example of the structure of the present wireless communication system is described with reference to FIG. 2.

Figure 2:
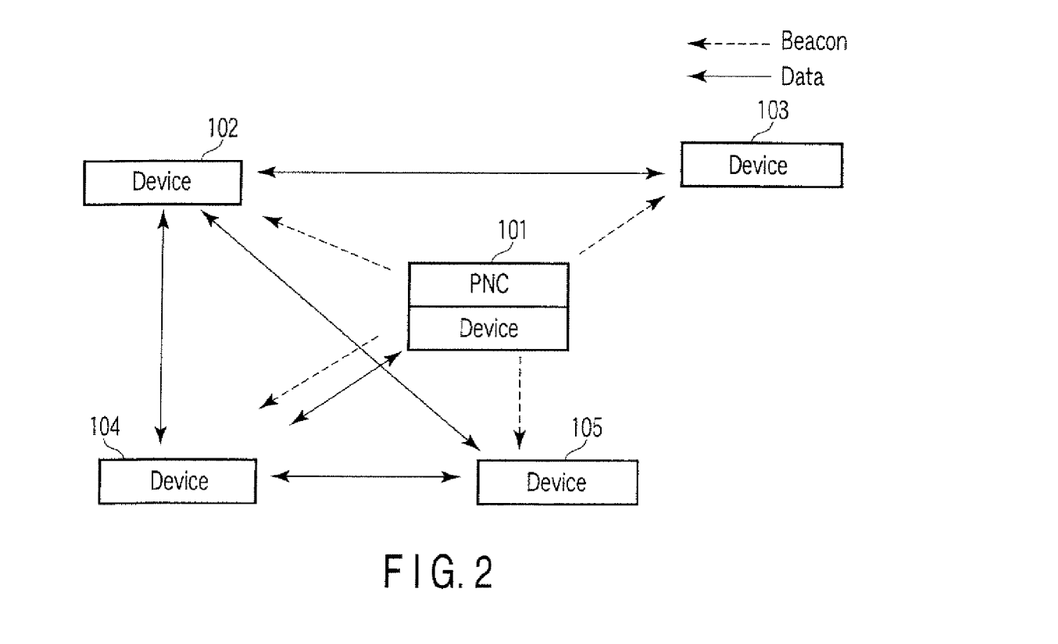
FIG. 2 is an exemplary block diagram showing an example of the structure of the wireless communication system according to the embodiment.

As shown in FIG. 2, the ad-hoc network of this wireless communication system is composed of a plurality of devices (wireless communication devices) 101, 102, 103, 104 and 105. These devices 101, 102, 103, 104 and 105 are configured to execute wireless communication with use of wireless signals of the millimeter-wave band.

In the ad-hoc network shown in FIG. 2, the device 101, for example, operates as a coordinator (PNC) which controls the single ad-hoc network comprising the devices 101 to 105. Further, the device 101 also executes wireless data communication with, e.g. the device 104.

The device 102 executes wireless data communication with other desired devices in a designated time under the control of the device 101 that is the PNC. Specifically, in accordance with a beacon which is transmitted from the device 101 that is the PNC, the device 102 executes wireless data communication with, for instance, the devices 103, 104 and 105.

The device 103 executes wireless data communication with other desired devices in a designated time under the control of the device 101 that is the PNC. Specifically, in accordance with a beacon which is transmitted from the device 101 that is the PNC, the device 103 executes wireless data communication with, for instance, the device 102.

The device 104 executes wireless data communication with other desired devices in a designated time under the control of the device 101 that is the PNC. Specifically, in accordance with a beacon which is transmitted from the device 101 that is the PNC, the device 104 executes wireless data communication with, for instance, the devices 101, 102 and 105.

The device 105 executes wireless data communication with other desired devices in a designated time under the control of the device 101 that is the PNC. Specifically, in accordance with a beacon which is transmitted from the device 101 that is the PNC, the device 105 executes wireless data communication with, for instance, the devices 102 and 104.

Next, the wireless communication between the devices is described.

The devices 101, 102, 103, 104 and 105 execute wireless communication with use of TDMA (Time Division Multiple Access). By using TDMA, the device which executes wireless communication can be restricted in units of a predetermined time. Therefore, it is possible to more stabilize the ad-hoc network of the present wireless communication system which uses radio waves of the millimeter-wave band having high directivity.

In the single ad-hoc network which is composed of the devices 101, 102, 103, 104 and 105, the single coordinator (PNC) is present, as described above, and this coordinator (PNC) controls the wireless communication between the devices. In FIG. 2, the device 101 functions as the coordinator (PNC).

Figure 3:
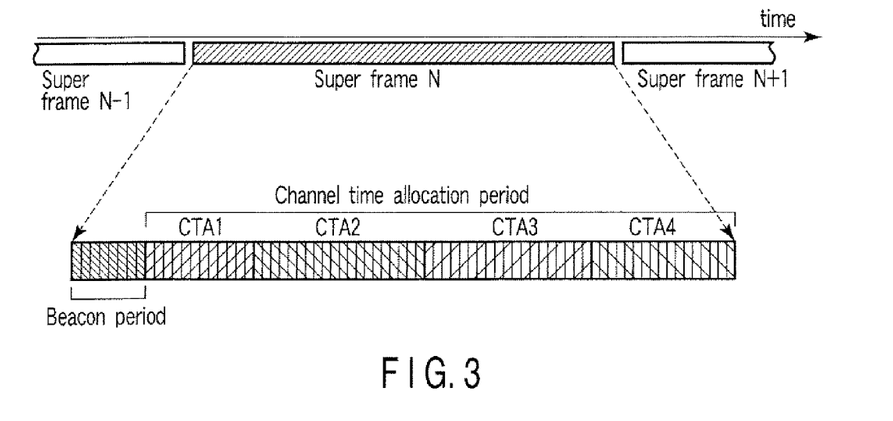
FIG. 3 is an exemplary view for explaining a TDMA communication control method which is used in the wireless communication system according to the embodiment.

FIG. 3 shows an example of a transfer time which is allocated to each of applications.

Wireless communication between the devices is executed by repeating a unit which is called "super frame". A communication period, which is called "beacon", is inserted at the beginning of each of super frames.

Specifically, the PNC receives a request which indicates a communication counterpart and a communication time and is transmitted from each device, 102, 103, 104, 105, and determines, in accordance with the request, how the communication time is allocated to each device, thus informing each device of the result of allocation by the beacon.

In FIG. 3, CTA (Channel Time Allocation) 1, CTA2, CTA3 and CTA4 indicate communication times that are allocated to the respective devices. For example, in the time period of CTA1, communication between the device 102 and device 103 is executed, and the other devices 101, 104 and 105 execute no wireless communication. Basically, one device and one other device, which is a counterpart of communication with this one device, are allocated to each CTA.

Figure 5:
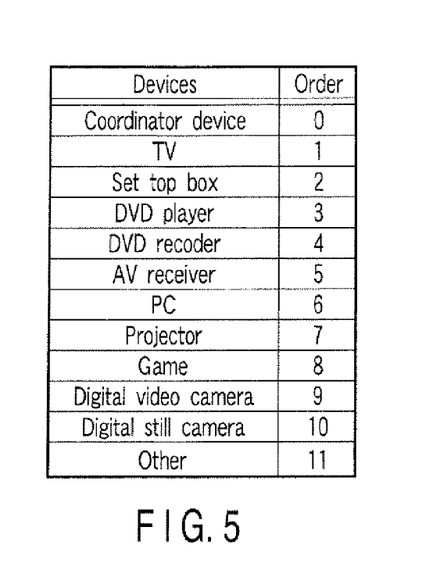
FIG. 5 shows an example of a PNC priority order table which is usable in the wireless communication system according to the embodiment.

To determine how to allocate the CTA to each device in the above manner is one of important functions of the PNC. It is thus desirable that the PNC be communicable with each of all devices which the user wishes to use. In the wireless LAN, only a specific device, such as an access point, controls the network. By contrast, in the ad-hoc network, the PNC is determined from among the devices in the ad-hoc network. In usual cases, as shown in FIG. 5, the PNC is determined on the basis of a PNC priority order table which indicates priority levels that are preset in association with device functions (also referred to as device types or device classes).

However, in the system using radio waves of the millimeter-wave band, there is such a characteristic of wireless communication that the directivity of the radio waves is high. Hence, if the method of determining the PNC on the basis of only the priority as shown in FIG. 5, there may arise a case in which a network, which is desired by the user, fails to be constituted.

Figure 4:
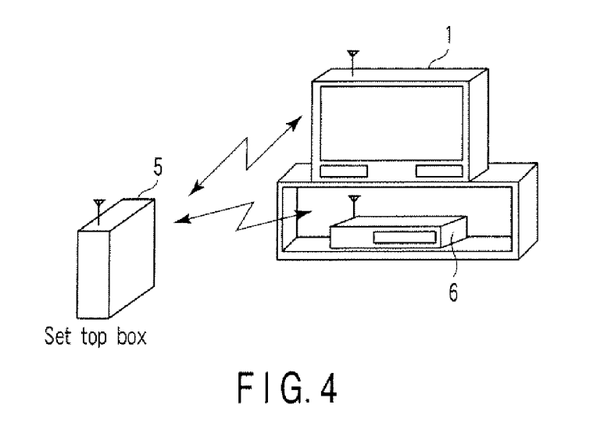
FIG. 4 is an exemplary view for explaining an example of arrangement of some devices which are used in the wireless communication system according to the embodiment.

For example, assume now that the TV 1, set-top box 5 and HDD/DVD recorder 6, which have been described with reference to FIG. 1, are disposed as shown in FIG. 4. In FIG. 4, the HDD/DVD recorder 6 is contained in a rack, and the TV 1 is placed on the rack. Accordingly, the TV 1 and the HDD/DVD recorder 6 have a vertical positional relationship, and a plate of the rack is present as an obstacle between the TV 1 and the HDD/DVD recorder 6. Thus, wireless communication between the TV 1 and HDD/DVD recorder 6 cannot be executed. On the other hand, wireless communication can be executed between the set-top box 5 and the TV 1 and between the set-top box 5 and the HDD/DVD recorder 6.

If the TV 1 is the PNC, the TV 1 can get a CTA for communication between the set-top box 5 and the TV 1, and can transmit information of the CTA to the set-top box 5 by a beacon. However, the HDD/DVD recorder 6 cannot receive a beacon from the TV 1, nor can the HDD/DVD recorder 6 send out a request for a CTA to the TV 1. Consequently, also, the HDD/DVD recorder 6 cannot execute communication with the set-top box 5. If the set-top box 5 is the PNC, it is possible to execute communication between the TV 1 and the set-top box 5 and communication between the HDD/DVD recorder 6 and the set-top box 5.

The situation, in which a proper device is not the PNC, as described above, occurs more frequently if mobile devices are present in the ad-hoc network.

In the wireless communication system in which devices are wirelessly connected, the user, unlike the case of wired connection, cannot easily understand which of devices is not connected to the network and why such a device fails to be connected.

To cope with this problem, in the wireless communication system of the present embodiment, reconfiguration of the network is instructed to the PNC from the device which the user wishes to use in order to realize wireless connection between the devices which are desired by the user, and thus the ad-hoc network is dynamically reconfigured so as to construct an ad-hoc network centering on the device which the user wishes to use.

Figure 6:
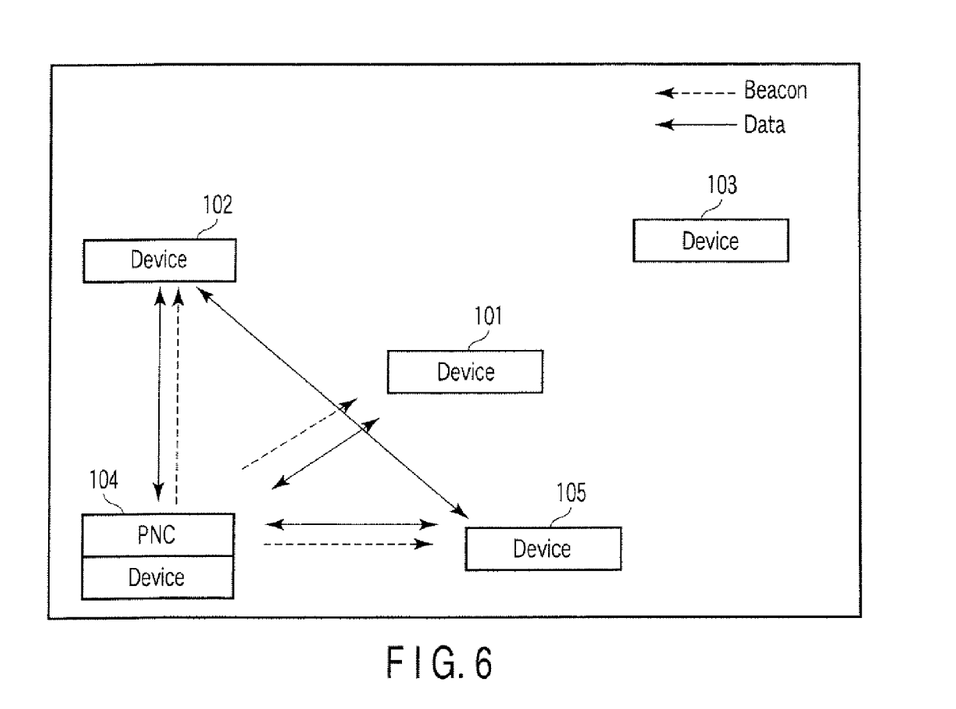
FIG. 6 is an exemplary block diagram for explaining a PNC changing process in the wireless communication system according to the embodiment.

FIG. 6 shows an example of the case in which an improper device is selected as the PNC.

The device 104 which is a PNC is unable to execute wireless communication with the device 103, for example, because the device 101 is an obstacle. Since the device 103 cannot execute transmission/reception of a beacon to/from the device 104 that is the PNC, the device 103 cannot communicate with other devices.

Assume now the case in which the user desires wireless connection between the device 102 and device 103. The user presses a predetermined button, for instance, which is provided on the device 102. The device 102 is one of the devices which the user wishes to use. In response to this button operation, the device 102 starts control of the device 104 that is the PNC, and issues a request for reconfiguration of the ad-hoc network to the device 104 that is the PNC.

Figure 7:
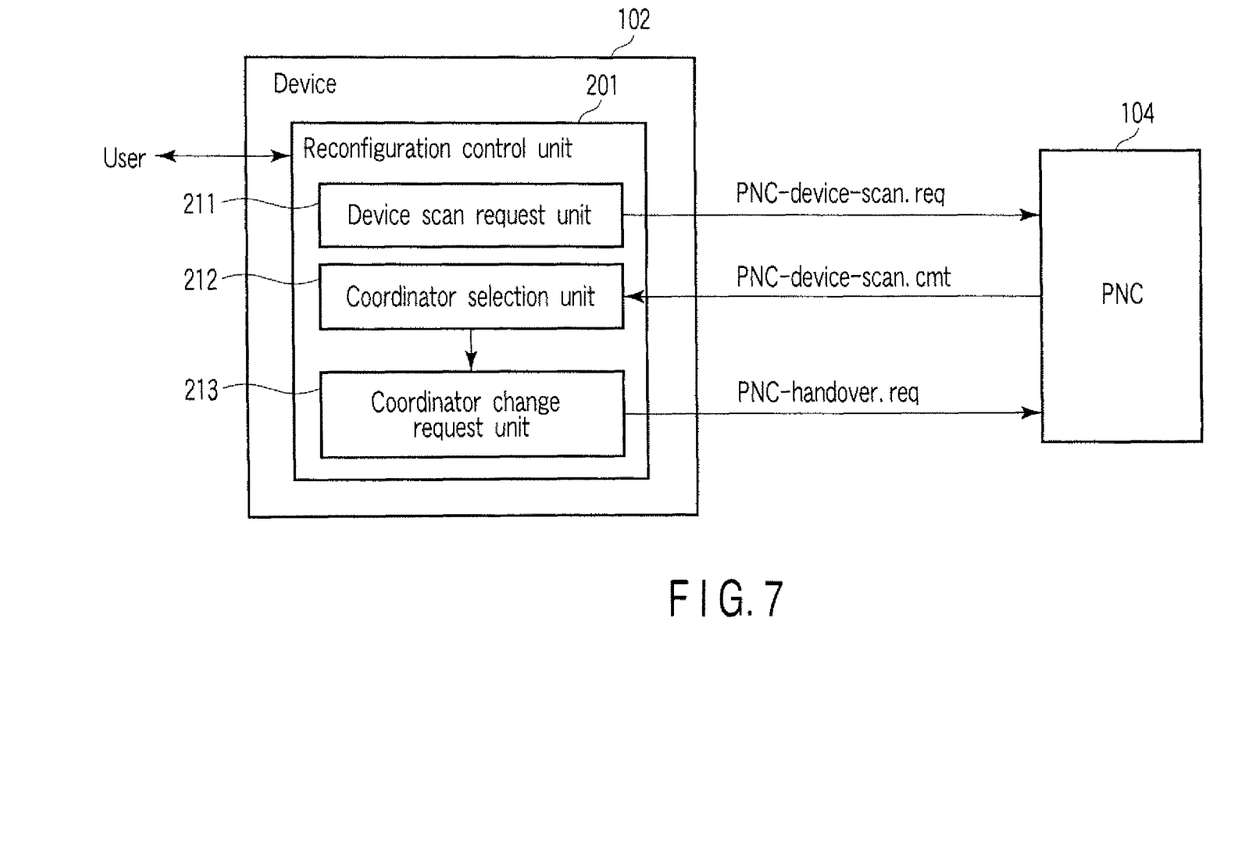
FIG. 7 is an exemplary block diagram showing the configuration of a reconfiguration control function which is provided in a wireless communication device which is used in the wireless communication system according to the embodiment.

FIG. 7 shows an example of the structure of the device 102.

The device 102 includes a reconfiguration control unit 201. The reconstruction control unit 201 requests to the PNC to reconfigure the ad-hoc network. The reconfiguration control unit 201 includes a device scan request unit 211, a coordinator selection unit 212 and a coordinator change request unit 213.

The device scan request unit 211 requests the device 104, which is the coordinator (PNC), to send a scan instruction to each of all devices in the ad-hoc network. Specifically, in response to a user operation (e.g. depression of the button of the device 102) for requesting reconfiguration of the ad-hoc network, the device scan request unit 211 transmits a scan request (PNC-device-scan.req) to the device 104 that is the coordinator (PNC) by a wireless signal. The scan request (PNC-device-scan.req) requests the device 104 to send to each of the devices which are controlled by the device 104 a scan instruction. The scan instruction instructs each of devices which are controlled by the device 104 to execute a scan process for detecting all devices which belong to a communication range thereof.

Each device, which has received the scan instruction from the device 104 that is the coordinator (PNC), executes the scan process for detecting all devices belonging to its own communication range. This scan process is executed, for example, while the direction of radiation of a wireless signal is being varied. Each device transmits a result of the scan process, that is, a list of all devices detected by the scan process, to the device 104 that is the coordinator (PNC) by a wireless signal.

The coordinator selection unit 212 receives, via the device 104 that is the coordinator (PNC), a result (PNC-device-scan.cmf) of the scan process which is executed by each of the devices that have received the scan instructions. Based on the received result of the scan process, the coordinator selection unit 212 selects a device from all devices in the ad-hoc network, which has a communication range to which the device 102 belongs (i.e. a device which can wirelessly communicate with the device 102).

Specifically, the coordinator selection unit 212 selects a device having a communication range which includes, for example, the device 102 and includes a largest number of belonging devices.

In order to designate the selected device as a new coordinator (PNC) of the ad-hoc network, the coordinator change request unit 213 transmits, by a wireless signal, to the device 104, which is the coordinator (PNC), a coordinator change request which requests execution of a process (handover) for transferring the authority of the coordinator to the selected device.

As has been described above, in the present embodiment, the current coordinator (PNC) is controlled from the device 102 which the user wishes to use, and thereby the network is reconfigured so that the device 102 which the user wishes to use belongs preferentially to the ad-hoc network.

Figure 8:
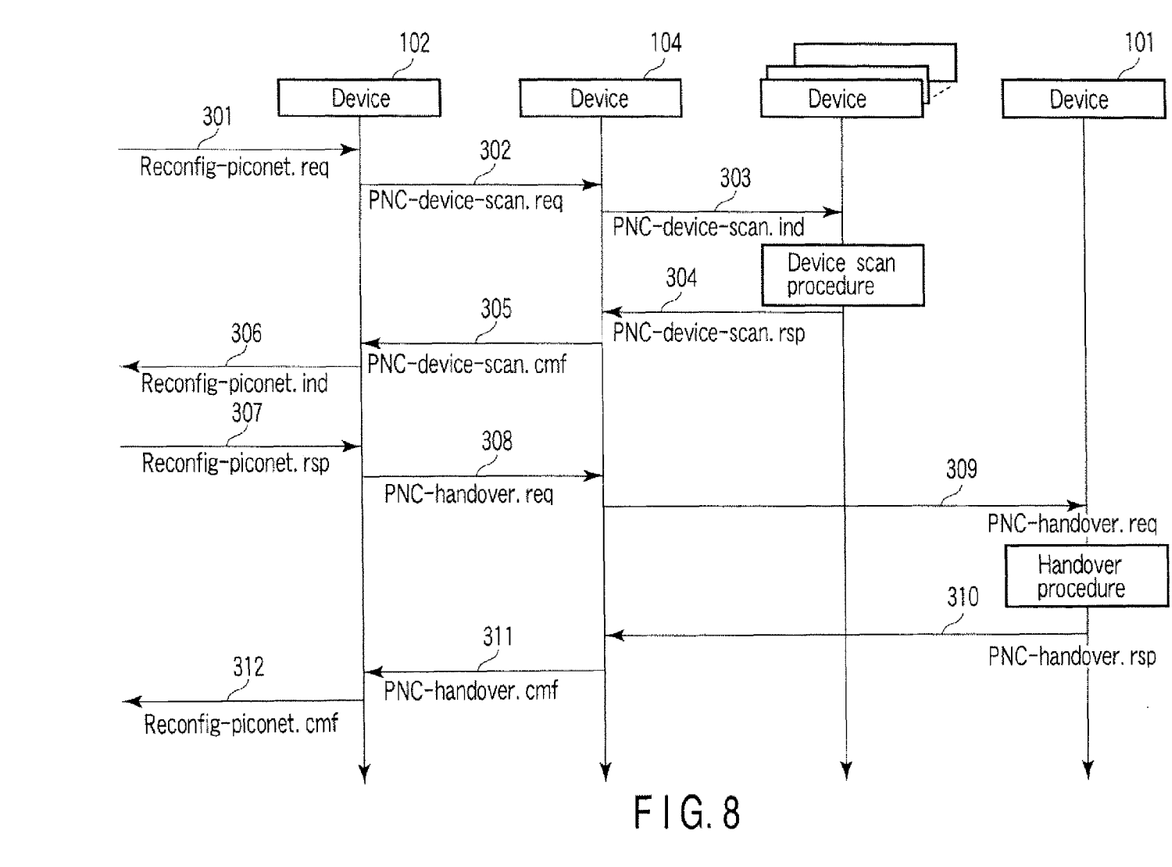
FIG. 8 illustrates an example of the procedure of a network reconfiguration process which is executed by the wireless communication system according to the embodiment.

Next, referring to FIG. 8, a description is given of the procedure of a network reconfiguration process which is executed by the wireless communication system according to the present embodiment.

Assume now the case in which the user wishes to reconfigure the network configuration in FIG. 6 so as to constitute a network centering on the device 102.

Step 301: The user issues a network reconfiguration request (reconfig-piconet.req) to the device 102 by pressing the button provided on the device 102.

Step 302: Triggered by the network reconfiguration request (reconfig-piconet.req) from the user, the device 102 transmits the scan request (PNC-device-scan.req) to the device 104 that is the PNC, thereby requesting the device 104 to transmit scan instructions to all devices.

Step 303: Upon receiving the scan request (PNC-device-scan.req), the device 104 that is the PNC transmits scan instructions (PNC-device-scan.ind) to all devices which the device 104 itself controls, thereby requesting each device to report a list of all devices which are present in the communication range that is covered by each device.

Figure 9:
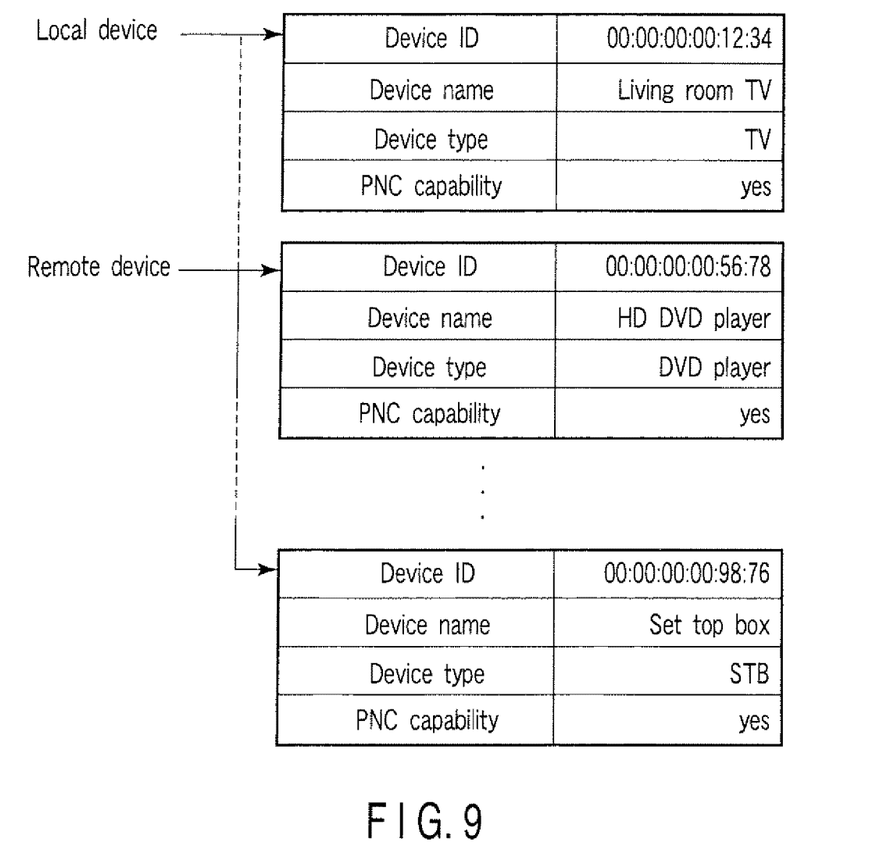
FIG. 9 shows an example of a list of communicable devices, which is reported from each device in the network reconfiguration process illustrated in FIG. 8.

Step 304: Each device, which has received the scan instruction (PNC-device-scan.ind), executes a scan process while varying the direction of radiation of a wireless signal, and transmits to the device 104, which is the PNC, a list of all devices, which are detected by the scan process, as a scan result response (PNC-device-scan.rsp). FIG. 9 shows an example of the list that is reported by the scan result response. In FIG. 9, "local device" is information relating to the device itself that reports the scan result, and this information includes a device ID, a device name, a device type and presence/absence of a PNC function. In addition, "remote device" is information relating to a device which is detected by the "local device", and this information includes a device ID, a device name, a device type and presence/absence of a PNC function.

Step 305: The device 104, which is the PNC, transmits the scan result (list), which is received from each device, to the device 102 as a scan result report (PNC-device-scan.cmf).

On the basis of the list (scan result report) received from each device, the device 102 selects a device, which is communicable with at least the device 102, as a new coordinator (PNC). In this case, if there are a plurality of devices which are communicable with the device 102, one of the devices, which is communicable with the device 102 and has a largest number of communicable devices, is selected as the new coordinator (PNC). Needless to say, of the devices which are communicable with the device 102, a device having a device type with a highest priority may be selected as the new coordinator (PNC) on the basis of the table shown in FIG. 5.

The device 102 may not only have the function of automatically selecting the new coordinator (PNC), but also may display the scan result report on the display screen of the device 102, as needed, and may prompt the user to select the new coordinator (PNC). In this case, the following process of steps 306 and 307 is executed.

Step 306: The device 102 displays the list, which is received from each device via the device 104 that is the PNC, on the display screen of the device 102 (reconfig-piconet.ind). In this case, the device 102, for example, displays lists, in which the device 102 is included as a communicable device, by arranging the lists in the order beginning with the list including a largest number of communicable devices. In the meantime, the list from the device that does not have the PNC function may be excluded from objects of display.

Step 307: The user selects a desired device which is communicable with the device 102 (reconfig-piconet.rsp).

Step 308: The device 102 transmits a coordinator change request (PNC-handover.req) to the device 104 that is the PNC, and requests the device 104 to transfer the authority of the coordinator to the device that is designated by the device 102. For example, in the case where the device 101 is selected as the new coordinator, the coordinator change request including information for designating the device 101 is transmitted from the device 102 to the device 104 that is the PNC.

Step 309, 310: The device 104 that is the PNC negotiates with the device (device 101) which is designated by the coordinator change request, and executes the handover process for transferring the authority of the coordinator to the device 101. Thereby, the PNC is changed from the device 104 to the device 101.

Step 311: If the handover process is successfully carried out and the PNC is changed from the device 104 to the device 101, the device 104 informs the device 102 that the PNC is changed to the device 101 (PNC-handover.cmf).

Step 312: The device 102 informs the user of the completion of the network reconfiguration, as needed (reconfig-piconet.cmf).

As has been described above, in the present embodiment, reconfiguration is instructed from the device, which the user wishes to use, to the current coordinator. Thereby, the ad-hoc network can dynamically be reconfigured so as to constitute a network centering on the device that the user wishes to use.

In step 305, the device 104 that is the PNC may not directly transmit the scan results (lists), which are received from the respective devices, to the device 102, but may extract only the list including the device 102 and transmit only the extracted list to the device 102.

The function of the reconfiguration control unit 201, which has been described with reference to FIG. 7, may be provided in each of all devices, or may be provided in only a specified device such as the PC 2. For example, in the case where the function of the reconfiguration control unit 201 is provided in a mobile device such as a portable computer, the TV 1 is made to function as the coordinator in usual cases. If transmission of AV data is executed between this mobile device and other devices, the mobile device requests the TV 1 to reconfigure the ad-hoc network in response to the user operation. Thus, the ad-hoc network is dynamically reconfigured so as to constitute an ad-hoc network centering on this mobile device. Thereby, the device, which is optimal for the use of the mobile device, can be made to function as the coordinator.

The function of the reconfiguration control unit 201, which has been described with reference to FIG. 7, can be realized by a communication control program which is executed by a CPU provided in the device. Needless to say, the function of the reconfiguration control unit 201 may be realized by a microcomputer or a DSP.

In the case where a device, on which a user operation for requesting reconfiguration of the ad-hoc network has been executed, is the device 104 that is the current coordinator (PNC), the device 104 transmits scan instructions (PNC-device-scan.ind) to all devices which the device 104 itself controls. On the basis of the lists (scan result reports) from the respective devices, the device 104 selects a device, which is communicable with at least the device 104, as a new coordinator (PNC), negotiates with this selected device, and executes a handover process for transferring the authority of the coordinator to the selected device.

While certain embodiments of the inventions have been described, these embodiments have been presented by way of example only, and are not intended to limit the scope of the inventions. Indeed, the novel methods and systems described herein may be embodied in a variety of other forms; further-more, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication device which executes, with use of a wireless signal of a millimeter-wave band, wireless communication with each of a plurality of devices which are present in an ad-hoc network, comprising:
    a processor;
    a scan request transmission unit communicatively coupled to the processor, the scan request transmission unit being configured to transmit a scan request to a coordinator being a device that controls the ad-hoc network, the scan request requesting the coordinator to transmit a scan instruction to each of the devices which are controlled by the coordinator, the scan instruction instructing each device to execute a scan process for detecting devices within a communication range;
    a selection unit communicatively coupled to the processor, the selection unit being configured to receive from the coordinator a result of the scan process which is executed by each of the devices which have received the scan instructions from the coordinator, and to select, on the basis of the received result of the scan process, a device from among the devices, which has a communication range to which at least the wireless communication device belongs; and
    a coordinator change request unit communicatively coupled to the processor, the coordinator change request unit being configured to transmit from the wireless communication device to the coordinator a coordinator change request for requesting execution of a process for transferring an authority of the coordinator to the selected device, thereby to designate the selected device as a new coordinator of the ad-hoc network.

2. The wireless communication device according to claim 1, wherein the selection unit selects, on the basis of the received result of the scan process, a device from among the devices, which has a communication range which includes the wireless communication device and includes a largest number of belonging devices.

3. The wireless communication device according to claim 1, wherein the scan request transmission unit transmits the scan request to the coordinator in response to a user operation which requests reconfiguration of the ad-hoc network.

4. The wireless communication device according to claim 1, wherein each of the devices, which have received the scan instructions, executes the scan process while varying a direction of radiation of a wireless signal.

5. In an ad-hoc network including a plurality of devices which execute wireless communication with use of a wireless signal of a millimeter-wave band, a first device comprising:
    a processor; and
    a reconfiguration control unit communicatively coupled to the processor, the reconfiguration control unit being adapted to request a coordinator to reconfigure the ad-hoc network, the coordinator being one of the plurality of devices different than the first device and controlling the ad-hoc network, the reconfiguration control unit comprising:
        a scan request transmission unit configured to transmit from the first device to the coordinator a scan request which requests the coordinator to transmit a scan instruction to each of the devices which are controlled by the coordinator, the scan instruction instructing each device to execute a scan process for detecting all devices which belong to a communication range thereof,
        a selection unit configured to receive from the coordinator a result of the scan process which is executed by each of the devices which have received the scan instructions from the coordinator, and to select, on the basis of the received result of the scan process, a device from among the devices, which has a communication range to which at least the device that has transmitted the scan request belongs, and
        a coordinator change request unit configured to transmit from the first device to the coordinator a coordinator change request for requesting execution of a process for transferring an authority of the coordinator to the selected device, thereby to designate the selected device as a new coordinator of the ad-hoc network.

6. The first device according to claim 5, wherein the selection unit selects, on the basis of the received result of the scan process, a device from among the devices, which has a communication range which includes the device that has transmitted the scan request and includes a largest number of belonging devices.

7. The first device according to claim 5, wherein the scan request transmission unit transmits the scan request to the coordinator in response to execution of a user operation which requests reconfiguration of the ad-hoc network.

8. A network control method for switching, between a plurality of devices which execute wireless communication with use of a wireless signal of a millimeter-wave band, a coordinator for controlling an ad-hoc network in which the plurality of devices are present, comprising:
    transmitting a scan request from one of the plurality of devices to the coordinator;
    transmitting, in response to the scan request, a scan instruction from the coordinator to each of the devices which are controlled by the coordinator, the scan instruction instructing each device to execute a scan process for detecting all wireless communication devices which belong to a communication range thereof;
    transmitting a result of the scan process, which is executed by each of the devices which have received the scan instructions, from the coordinator to the device which has transmitted the scan request;
    selecting, on the basis of the result of the scan process which is transmitted to the device which has transmitted the scan request, a device from among the plurality of devices, which has a communication range to which at least the device that has transmitted the scan request belongs; and
    transmitting, from the device that has transmitted the scan request to the coordinator, a coordinator change request for requesting execution of a process for transferring an authority of the coordinator to the selected device, thereby to designate the selected device as a new coordinator of the ad-hoc network.

9. The network control method according to claim 8, wherein said selecting includes selecting, on the basis of the result of the scan process which has been received, a device from among the devices, which has a communication range which includes the device that has transmitted the scan request and includes a largest number of belonging devices.

10. The network control method according to claim 8, wherein the scan request is transmitted to the coordinator from the device on which a user operation which requests reconfiguration of the ad-hoc network is executed.

* * * * *